(12) United States Patent
Iwata et al.

(10) Patent No.: US 10,278,052 B2
(45) Date of Patent: Apr. 30, 2019

(54) ON-VEHICLE EMERGENCY NOTIFICATION DEVICE

(71) Applicant: MAZDA MOTOR CORPORATION, Hiroshima (JP)

(72) Inventors: Kengo Iwata, Hiroshima (JP); Masanobu Kosaka, Kure (JP); Masahiro Kobayashi, Hiroshima (JP); Yuki Komazaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/763,727

(22) PCT Filed: Mar. 30, 2017

(86) PCT No.: PCT/JP2017/013271
§ 371 (c)(1),
(2) Date: Mar. 27, 2018

(87) PCT Pub. No.: WO2017/170872
PCT Pub. Date: Oct. 5, 2017

(65) Prior Publication Data
US 2018/0242132 A1 Aug. 23, 2018

(30) Foreign Application Priority Data
Mar. 30, 2016 (JP) .................... 2016-068351

(51) Int. Cl.
*H04W 4/90* (2018.01)
*B60R 16/033* (2006.01)
(Continued)

(52) U.S. Cl.
CPC ............ *H04W 4/90* (2018.02); *B60R 16/033* (2013.01); *B60R 21/00* (2013.01); *G07C 5/008* (2013.01);
(Continued)

(58) Field of Classification Search
CPC ................................ G08B 25/016; B60Q 1/52
See application file for complete search history.

(56) References Cited

U.S. PATENT DOCUMENTS 6,262,655 B1 *  7/2001  Yoshioka ............. G08B 25/016
                                                    340/425.5
7,289,786 B2 * 10/2007  Krasner ............... G08B 25/016
                                                    455/404.2
(Continued)

FOREIGN PATENT DOCUMENTS

JP      2000-278885 A     10/2000
JP       2000278885 A  *  10/2000

OTHER PUBLICATIONS

International Search Report issued in PCT/JP2017/013271; dated May 30, 2017.

*Primary Examiner* — Quan-Zhen Wang
*Assistant Examiner* — Rajsheed O Black-Childress
(74) *Attorney, Agent, or Firm* — Studebaker & Brackett PC

(57) ABSTRACT

The present invention relates to an on-vehicle emergency notification device The notification device is configured to allow a vehicle body number and an emergency notification phone number to be registered therein in the form of a set, so as to enable the notification to the emergency call center, wherein the notification device is configured such that: during execution of a factory mode for performing the registration of the vehicle body number and the emergency notification phone number, rewriting of the vehicle body number is permitted; after the registration of the vehicle body number and the emergency notification phone number is completed and then the factory mode is shifted to a market mode, the rewriting of the vehicle body number is prohib-
(Continued)

ited; and, when it is in the factory mode, the switching to an auxiliary battery is prohibited.

6 Claims, 5 Drawing Sheets

(51) Int. Cl.
    *G07C 5/00*          (2006.01)
    *B60R 21/00*        (2006.01)
    *G08B 25/08*        (2006.01)
    *H02J 7/00*          (2006.01)
    *G08B 5/36*         (2006.01)
    *H04W 4/44*        (2018.01)

(52) U.S. Cl.
    CPC ............... *G08B 5/36* (2013.01); *G08B 25/08* (2013.01); *H02J 7/00* (2013.01); *H04W 4/44* (2018.02)

(56) References Cited

U.S. PATENT DOCUMENTS

2017/0206777 A1*   7/2017  Nishida ................. G08B 29/12
2017/0337813 A1*  11/2017  Taylor ................. G08G 1/0141

* cited by examiner

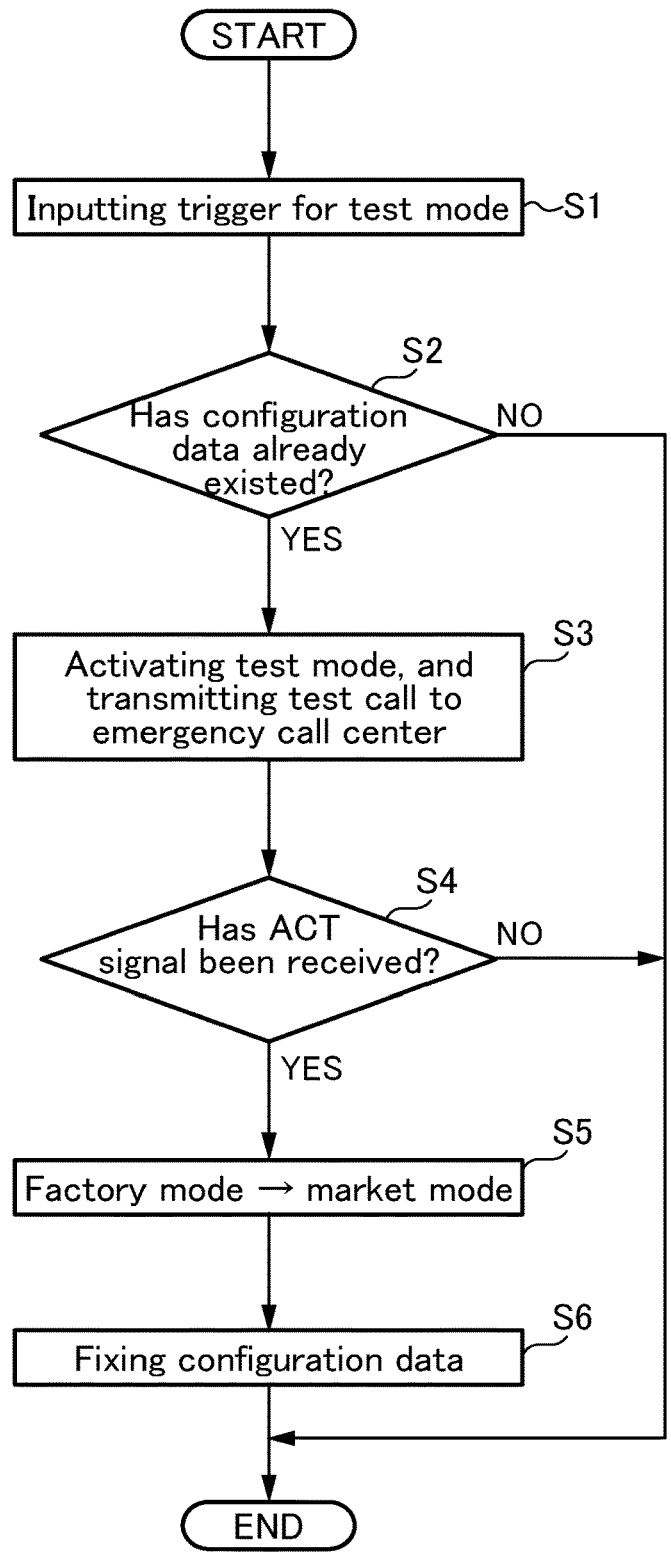

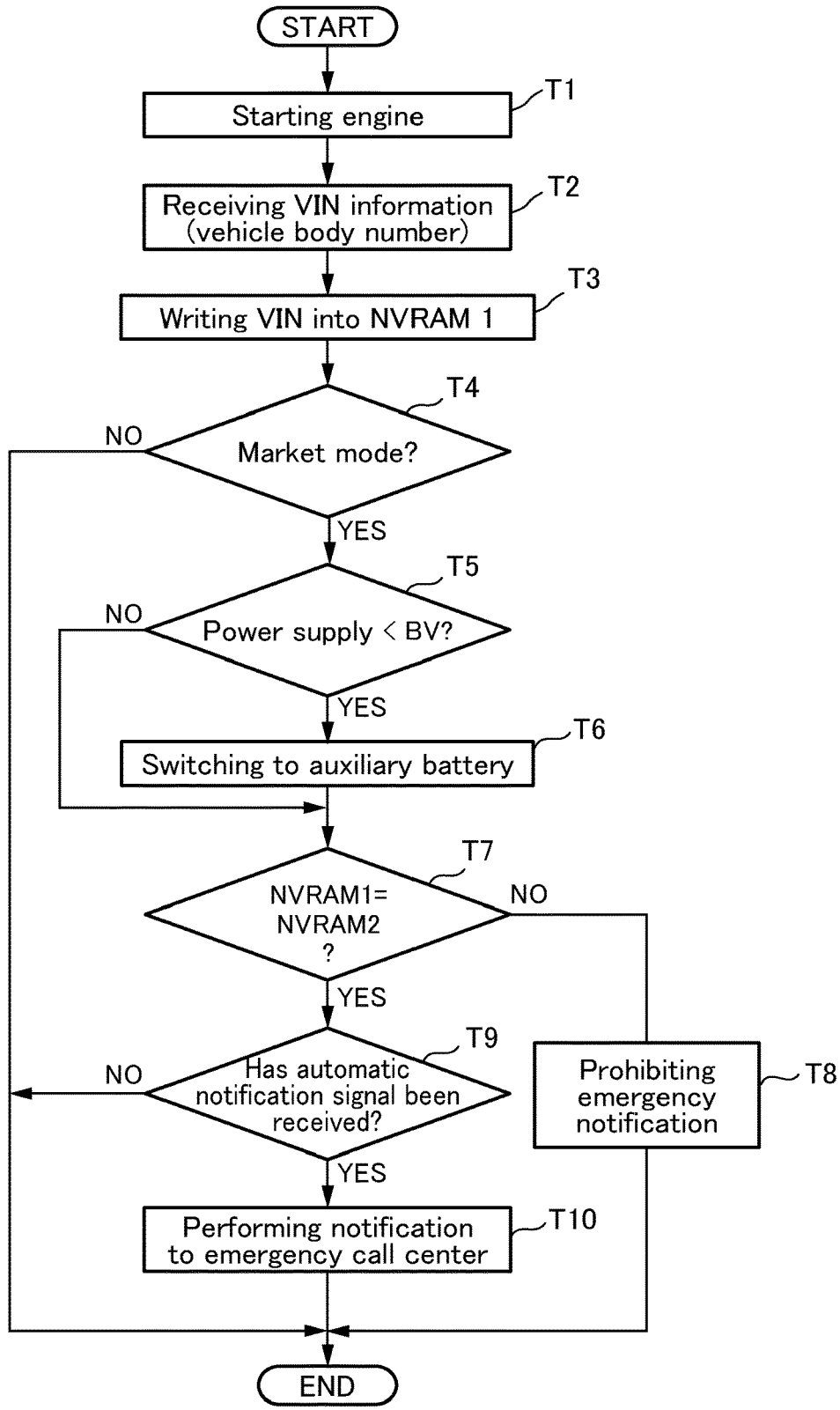

ON-VEHICLE EMERGENCY NOTIFICATION DEVICE

TECHNICAL FIELD

The present invention relates to an on-vehicle emergency notification device, and more particularly to an on-vehicle emergency notification device for performing a notification to an external information center, in the event of an emergency regarding a vehicle or a vehicle occupant.

BACKGROUND ART

Heretofore, there has been known a technique of mounting an emergency notification device on a vehicle such as an automotive vehicle, wherein, in the event of an emergency such as traffic accident or sudden illness, a vehicle occupant can perform a notification to an emergency call center as an information center to ask for rescue contacts with rescue facilities such as a fire department, a police department and a medical center.

In this emergency notification device, vehicle body information such as a vehicle body number and an emergency notification phone number is preliminarily registered. Further, in the event of an emergency, vehicle location information and other information are automatically or manually notified to the emergency call center, together with the vehicle body information.

One example of this conventional on-vehicle emergency notification device is described in the following Patent Document 1. In the on-vehicle emergency notification device described in the Patent Document 1, when a user presses an emergency notification transmit button in the event of an emergency such as traffic accident, a notification is performed to an information center by a phone built into the device, and then when a communicable state with the information center is established, data such as a vehicle traveling direction and vehicle location information is transmitted to the information center, followed by a voice call.

Further, the on-vehicle emergency notification device described in the Patent Document 1 is configured to normally receive supply of electric power from a main battery of the vehicle. However, in the case where the vehicle undergoes a collision due to traffic accident or the like, the main battery itself can be damaged, or an interconnection can be disconnected, making it impossible to supply electric power from the main battery. Therefore, an auxiliary battery is built into the on-vehicle emergency notification device to enable the on-vehicle emergency notification device to receive the supply of electric power therefrom in place of the main battery.

CITATION LIST

[Patent Document]
  Patent Document 1: 2000-278885A

SUMMARY OF INVENTION

Technical Problem

In the above conventional on-vehicle emergency notification device, when a vehicle is transported from a vehicle factory for manufacturing vehicles to a dealer (distributor), connection with the main battery is cut. However, upon cutting the connection with the main battery, the on-vehicle emergency notification device is switchably connected to the auxiliary battery, leading to a problem that the auxiliary battery is consumed due to dark current.

The present invention has been made in view of solving the above conventional problem, and an object thereof is to provide an on-vehicle emergency notification device capable of prohibiting switching from a main battery to an auxiliary battery to thereby suppress electric power consumption due to dark current occurring during transportation of a vehicle or the like.

Solution to Technical Problem

In order to achieve the above object, the present invention provides an on-vehicle emergency notification device for performing a notification to an external information center, in the event of an emergency regarding a vehicle or a vehicle occupant. The on-vehicle emergency notification device comprises an auxiliary battery, wherein the on-vehicle emergency notification device is configured such that, when a voltage of a main battery mounted on the vehicle is lowered, a power supply thereof is switched from the main battery to the auxiliary battery, and wherein the on-vehicle emergency notification device is configured to allow a vehicle body number and an emergency notification phone number to be registered therein in the form of a set, so as to enable the notification to the information center, wherein the on-vehicle emergency notification device is configured such that: during execution of a factory mode for performing the registration of the vehicle body number and the emergency notification phone number, rewriting of the vehicle body number is permitted; after the registration of the vehicle body number and the emergency notification phone number is completed and then the factory mode is shifted to a market mode, the rewriting of the vehicle body number is prohibited; and, when it is in the the factory mode, the switching to the auxiliary battery is prohibited.

In the on-vehicle emergency notification device of the present invention having the above feature, when the voltage of the vehicle-mounted main battery is lowered (the causes include damage of the main battery or disconnection of interconnection to the main battery), the power supply is switched to the auxiliary battery. However, when the on-vehicle emergency notification device is in the factory mode, the switching to the auxiliary battery is prohibited. For example, in a situation where the vehicle is transported from a vehicle factory to a dealer, the on-vehicle emergency notification device is in the factory mode. Thus, in this situation, it is possible to suppress electric power consumption of the auxiliary battery due to dark current caused by the switching to the auxiliary battery.

Preferably, the on-vehicle emergency notification device of the present invention is configured such that, when the factory mode is shifted to the market mode, the switching to the auxiliary battery is permitted.

According to this feature, when the factory mode is shifted to the market mode, the switching to the auxiliary battery is permitted. Thus, even in a situation where the voltage of the main buttery is lowered due to traffic accident or the like, it is possible to perform a notification to the information center.

Preferably, the on-vehicle emergency notification device of the present invention is configured such that, when it receives a receipt signal indicative of receipt of the vehicle body number and emergency notification phone number, from the information center, the switching to the auxiliary battery is permitted.

According to this feature, when the on-vehicle emergency notification device receives a receipt signal indicative of receipt of the vehicle body number and emergency notification phone number, from the information center, the switching to the auxiliary battery is permitted. Thus, even in the situation where the voltage of the main buttery is lowered due to traffic accident or the like, it is possible to perform a notification to the information center.

Preferably, in the above on-vehicle emergency notification device, the receipt signal to be received by the on-vehicle emergency notification device is a signal to be transmitted from the information center to the on-vehicle emergency notification device, when the vehicle body number and the emergency notification phone number currently received by the information center are coincident, respectively, with a vehicle body number and an emergency notification phone number preliminarily acquired by the information center.

Preferably, the on-vehicle emergency notification device of the present invention is configured such that, when it is in the factory mode in a situation where the vehicle is transported from a vehicle factory for manufacturing vehicles to a dealer, connection with the main battery is cut.

Effect of Invention

The on-vehicle emergency notification device of the present invention is capable of prohibiting switching from a main battery to a backup battery to thereby suppress electric power consumption due to dark current occurring during transportation of a vehicle or the like.

BRIEF DESCRIPTION OF DRAWINGS

FIG. 3 is a flowchart depicting a process of shifting from a factory mode to a market mode, in the on-vehicle emergency notification device according to this embodiment.

FIG. 5 is a flowchart depicting a process of prohibiting switching from a main battery to an auxiliary battery in the market, and a process of performing a notification to an emergency call center, in the on-vehicle emergency notification device according to this embodiment.

DESCRIPTION OF EMBODIMENTS

With reference to the drawings, an on-vehicle emergency notification device according to one embodiment of the present invention will now be described.

Figure 1:
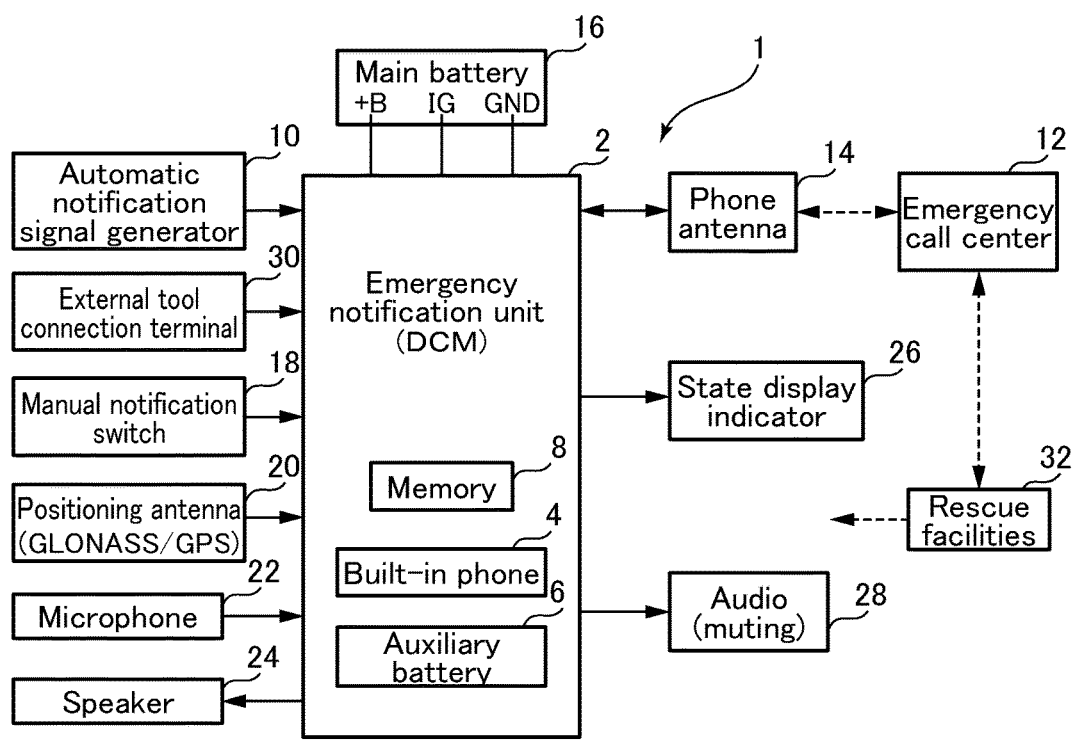
FIG. 1 is a block diagram depicting an overall configuration of an on-vehicle emergency notification device according to one embodiment of the present invention.

First of all, with reference to FIG. 1, an overall configuration of the on-vehicle emergency notification device according to this embodiment will be described. The reference sign 1 denotes the on-vehicle emergency notification device. This on-vehicle emergency notification device 1 comprises an emergency notification unit 2 as a main unit of the device. This emergency notification unit 2 is also called "DCM (Date Communication Module)", and is constructed such that an emergency notification built-in phone 4, an auxiliary battery 6, and a memory 8 for storing an aftermentioned vehicle body number and others, are built thereinto.

The on-vehicle emergency notification device 1 further comprises: an automatic notification signal generator 10 for generating an "automatic notification signal" in conjunction with activation of an airbag in the event of a vehicle accident such as a collision, and transmitting the automatic notification signal to the emergency notification unit 2; and a phone antenna 14 for performing a notification to an emergency call center 12 as an external information center, in the event of the vehicle accident.

The on-vehicle emergency notification device 1 is connected to a vehicle-mounted main battery 16, and configured to be supplied with electric power therefrom. This main battery 16 has a+B power source, an IG power source, and a GND (EARTH).

Further, the on-vehicle emergency notification device 1 is configured such that, when the voltage of the main battery 16 is lowered due to traffic accident or the like, the power source thereof is switched from the main battery 16 to the auxiliary battery 6, so as to perform a notification to the emergency call center 12.

To the emergency notification unit (DCM) 2, a manual notification switch 18 for manually performing a notification to the emergency call center 12, and a positioning antenna 20 for receiving radio waves from positioning satellites such as GPSs (Japan, USA, etc.) or GLONASSs (Russia) to measure a current location, are connected. Further, a microphone 22 and a speaker 24 are also connected to the emergency notification unit (DCM) 2 to enable a conversation with the emergency call center 12 via the built-in phone 4.

The emergency notification unit (DCM) 2 connects to a state display indicator 26 for displaying various states regarding an aftermentioned emergency notification. The emergency notification unit (DCM) 2 also connects to a vehicle-mounted audio 28 which is configured to be muted during notification to the emergency call center 12.

Further, the emergency notification unit (DCM) 2 is provided with an external tool connection terminal 30 which is configured to allow an external tool for executing an aftermentioned test mode, or the like, to be connected thereto.

The emergency call center 12 is capable of transferring the notification to rescue facilities 32 such as a fire department, a police department and a medical center so as to deal with the accident.

The on-vehicle emergency notification device 1 is configured such that, when the voltage of the main battery 16 is lowered due to traffic accident or the like, the power supply thereof is switched to the auxiliary battery 6 to thereby enable a notification to the emergency call center 12.

Figure 2:
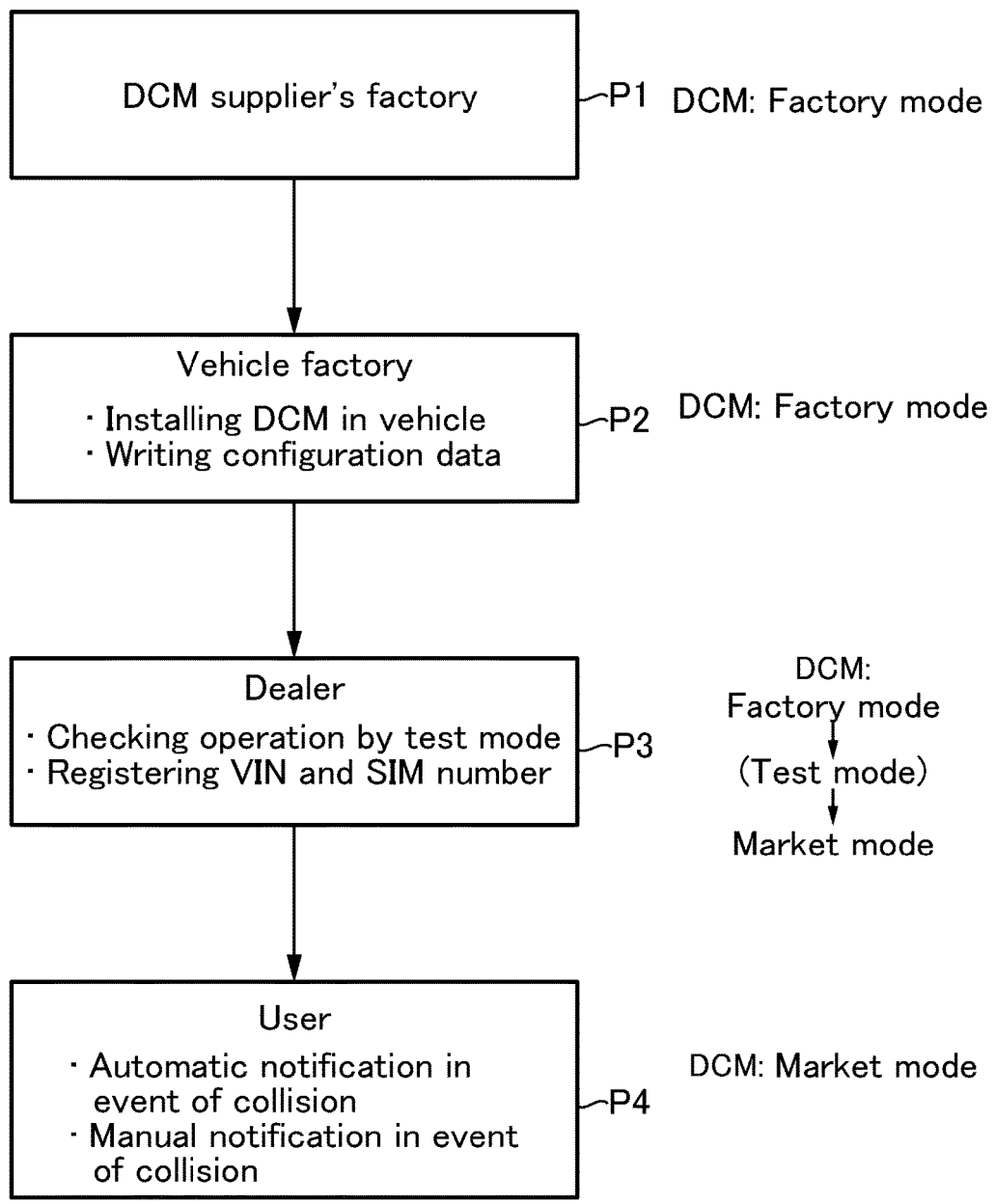
FIG. 2 is a flowchart depicting a flow from a supplier's factory to a user through a vehicle factory and a dealer, in the on-vehicle emergency notification device according to this embodiment.

Next, with reference to FIG. 2, a flow from a supplier's factory to a user through a vehicle factory and a dealer (distributor) in the on-vehicle emergency notification device 1 will be described. In FIG. 2, the reference sign "P" denotes step.

First of all, as presented in P1, the emergency notification unit (DCM) 2 of the on-vehicle emergency notification device 1 is shipped from a factory of a supplier as a manufacturer of the DCMs 2 to a vehicle factory of a manufacturer of automobile vehicles. At a time of shipping from the supplier's factory, the DCM 2 is set in a "factory mode" in which a vehicle body number and others are rewritable.

Thus, during transportation from the supplier's factory, the DCM 2 is in the "factory mode", i.e., is not the "market mode". Thus, even in the situation where the voltage of the main battery 16 is lowered, the switching to the auxiliary battery 6 is prohibited in the on-vehicle emergency notification device 1.

Then, as presented in P2, at the vehicle factory, the emergency notification unit (DCM) 2 is installed in a vehicle, and configuration data such as "vehicle body number", "vehicle type", "fuel type (gasoline, light oil)", and "vehicle body type" is written into the DCM 2.

This embodiment will be described based on one example in which a vehicle identification number (VIN) is used as the "vehicle body number".

In the vehicle factory, the DCM 2 is in the "factory mode" i.e., is not the "market mode". Thus, even in the situation where the voltage of the main battery 16 is lowered, the switching to the auxiliary battery 6 is prohibited in the on-vehicle emergency notification device 1.

Then, as presented in P3, at the dealer, a test mode is executed. This test mode is intended to check whether or not the emergency notification unit (DCM) 2 of the emergency notification device 1 normally operates. After the DCM 2 is subjected to various checking operations under this test mode, and then goes through a given step, the VIN and an emergency notification phone number (CIM number) are registered. As a result, the "factory mode" is changed to a "market mode" in which the rewriting of the vehicle body number is prohibited.

After the "factory mode" is changed to a "market mode", when the voltage of the main battery 16 is lowered, the switching to the auxiliary battery 6 is permitted in the on-vehicle emergency notification device 1.

Last of all, as presented in P4, the vehicle is delivered to a user. At this time, the "factory mode" has been already shifted to the "market mode". Thus, when the voltage of the main battery 16 is lowered, the switching to the auxiliary battery 6 is permitted in the on-vehicle emergency notification device 1.

Therefore, in the event of a traffic accident during driving of the vehicle by the user (driver), the collision accident is notified to the emergency call center 12, automatically or manually by the user.

On the other hand, in the event of sudden illness of a vehicle occupant, the user (vehicle occupant) of the vehicle can also perform a notification to the emergency call center 12, using the manual notification switch 18.

During the automatic or manual notification, in addition to the vehicle body number (VIN) and the emergency notification phone number (CIM number), vehicle location information, the remaining configuration data and others are transmitted to the emergency call center 12.

Next, with reference to FIG. 3, a process of shifting from the factory mode to the market mode in the on-vehicle emergency notification device 1, to be executed at the dealer, will be specifically described. In FIG. 3, the reference sign "S" denotes step.

In S1 depicted in FIG. 3, a trigger for the test mode is input. For example, this trigger for the test mode is a manipulation capable of triggering execution of the test mode, such as manipulating another device (e.g., turn indicator lever) of the vehicle in a given sequence and by a given number of times. In the case where the dealer has an external tool for the test mode, this external tool may be connected to the external tool connection terminal 30 of the emergency notification unit (DCM) 2 to execute the test mode. In this case, the S1 is omitted.

Subsequently, the process proceeds to S2. In the S2, it is determined whether or not the configuration data has been input into the DCM 2. When the configuration data is determined to have been input, the process proceeds to S3. In the S3, the test mode is activated to perform given checking operations. When there is not any defect or the like, the "vehicle body number (VIN)" and the "emergency notification phone number" are transmitted to the emergency call center 12. Subsequently, the process proceeds to S4. In the S4, it is determined whether or not the DCM 2 has received an "ACT signal" from the emergency call center 12. In this embodiment, the ACT signal means a "receipt signal indicative of receipt of the vehicle number and the emergency notification phone number" transmitted from the emergency call center 12.

In this case, information about the vehicle number, the emergency notification phone number and others was preliminarily transmitted to the emergency call center 12. Thus, when currently-received information is coincident with the preliminarily-acquired information, the emergency call center 12 transmits the ACT signal.

When the ACT signal is determined to have been received, the process proceeds to S5. In the S5, the factory mode is shifted to the market mode. Subsequently, the process proceeds to S6. In the S6, the configuration data is fixed, i.e., registered, although details thereof will be described later. Specifically, the same vehicle body number (VIN) and emergency notification phone number as those transmitted to the emergency call center 12 are registered in the form of a set.

In the on-vehicle emergency notification device 1 according to this embodiment, a vehicle body number (VIN) is registered in the emergency notification unit 2, and, after shifting to the market mode, a vehicle body number acquired from a vehicle-side device is checked against the registered vehicle body number, to thereby prevent the device from being wrongly used. Therefore, in the on-vehicle emergency notification device 1, rewriting of a vehicle body number is prohibited during the market mode.

Figure 4A:
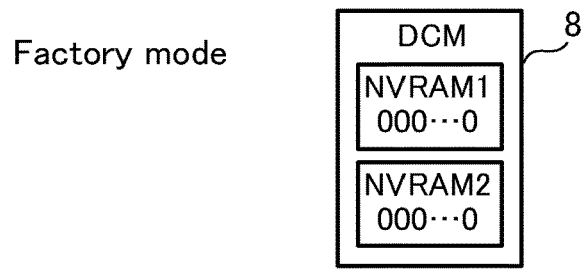
FIG. 4A is a diagram depicting a procedure for prohibiting rewriting of a vehicle body number in a memory during the market mode, in the on-vehicle emergency notification device according to this embodiment.

With reference to FIGS. 4A to 4D, a procedure for prohibiting rewriting of a vehicle body number in the memory during the market mode will be described. First of all, as depicted in FIG. 4A, the memory 8 of the emergency notification unit (DCM) 2 comprises a "vehicle information-recording NVRAM 1" and an "emergency call center transmit data-storing NVRAM 2" each for storing therein information such as a vehicle body number. In the supplier's factory for manufacturing the emergency notification unit 2, the emergency notification unit 2 is set in the "factory mode", and all bits in each of the "vehicle information-recording NVRAM 1" and the "emergency call center transmit data-storing NVRAM 2" are set to zero.

Figure 4B:
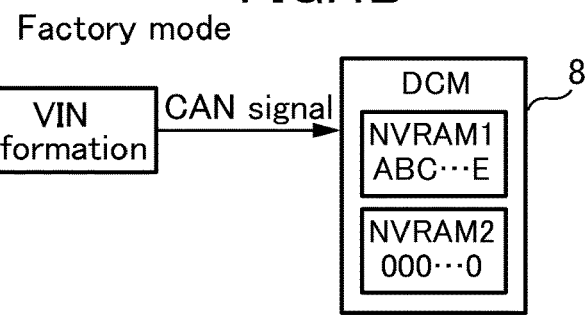
FIG. 4B is a diagram depicting the procedure for prohibiting the rewriting of the vehicle body number in the memory during the market mode, in the on-vehicle emergency notification device according to this embodiment.

Subsequently, as depicted in FIG. 4B, when the DCM 2 receives a CAN signal containing a vehicle body number (VIN information) from a vehicle-side device, and a given updating condition is satisfied, the "vehicle information-recording NVRAM 1" is updated (rewritten).

Figure 4C:
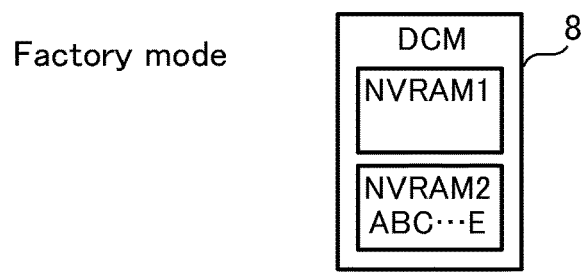
FIG. 4C is a diagram depicting the procedure for prohibiting the rewriting of the vehicle body number in the memory during the market mode, in the on-vehicle emergency notification device according to this embodiment.

Subsequently, as depicted in FIG. 4C, when, as a result of execution of the test, it has been confirmed that operation of the DCM 2 is normal, a value of the vehicle body number in the "emergency call center transmit data-storing NVRAM 2" is set to become coincident with a value (ABC-E) of the vehicle body number in the "vehicle information-recording NVRAM 1", and the "emergency call center transmit data-storing NVRAM 2" is set to be unrewritable. After this, the "factory mode" is shifted to the "market mode".

Figure 4D:
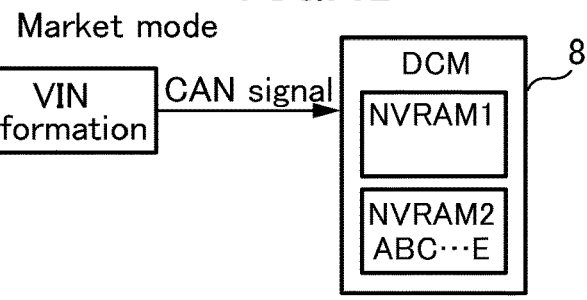
FIG. 4D is a diagram depicting the procedure for prohibiting the rewriting of the vehicle body number in the memory during the market mode, in the on-vehicle emergency notification device according to this embodiment.

Subsequently, as depicted in FIG. 4D, in the "market mode", the DCM 2 receives a CAN signal containing VIN information (vehicle body number) from a vehicle-side device, and, after writing the received vehicle body number into the "vehicle information-recording NVRAM 1", compares the written vehicle body number with the vehicle body number in the "emergency call center transmit data-storing NVRAM 2". When the two vehicle body numbers are coincident with each other, the emergency notification unit 2 normally operates to automatically or manually perform a notification. On the other hand, when the two vehicle body numbers are not coincident with each other, the emergency notification unit 2 operates to indicate "malfunction" on the state display indicator 26, and prohibit the automatic or manual notification to the emergency call center 12.

Next, with reference to FIG. 5, the operation of the on-vehicle emergency notification device 1 according to this embodiment will be described. In FIG. 5, the reference sign "T" denotes step.

First of all, in T1, a user (driver) turns on the power supply of the vehicle, specifically the Ig power supply, to start an engine. Then, the operation proceeds to T2. Upon start of the engine, VIN information including a vehicle body number (VIN) is received from a vehicle-side device. Subsequently, the operation proceeds to T3. In the T3, the received vehicle body number (VIN) is written into the "vehicle information-recording NVRAM 1" of the memory 8.

Subsequently, the operation proceeds to T4. In the T4, it is determined whether or not the on-vehicle emergency notification device 1 is in the "market mode". When the on-vehicle emergency notification device 1 is determined to be in the "market mode", the operation proceeds to T5. On the other hand, when the on-vehicle emergency notification device 1 is determined to be not in the "market mode", i.e., to be in the "factory mode", the operation is terminated.

In the T5, it is determined whether or not a power supply (voltage) of the main buttery 16 becomes lower than BV which is a given low voltage. Specifically, the power-supply voltage is typically 12V. Thus, it is determined whether or not the power-supply voltage 12V becomes lower than 6 to 7V. When the voltage is determined to be not lowered, the operation proceeds to T7. On the other hand, when the voltage is determined to be lowered, the operation proceeds to T6. When the voltage is determined to be lowered, there is a case where the power supply voltage is zero. The causes specifically include damage of the main battery 16 or disconnection of interconnection to the main battery 16.

In the T6, the power supply of the emergency notification unit (DCM) 2 is switched from the vehicle-mounted main battery 16 to the auxiliary battery 6. As a result, even if supply of electric power from the main battery 16 becomes impossible due to damage of the main battery itself or disconnection of interconnection to the main battery caused by traffic accident or the like, it is possible to receive the supply of electric power from the auxiliary battery 6 in place of the main battery 16 and perform a notification to the emergency call center.

Subsequently, the operation proceeds to T7. In the T7, it is determined whether or not the vehicle body number (VIN) currently written into and stored in the "vehicle information-recording NVRAM 1" is coincident with the vehicle vehicle body number (VIN) stored in the "emergency call center transmit data-storing NVRAM 2".

In the T7, if the two vehicle body numbers are determined to be not coincident with each other, there is a possibility that the built-in phone 4 of the emergency notification unit (DCM) 2 is wrongly used. Thus, in order to prevent the wrongful use, the operation proceeds to T8. In the T8, a warning lamp is blinked on the state display indicator 26, and the notification to the emergency call center 12 is prohibited.

On the other hand, when the two vehicle body numbers are determined, in the T7, to be coincident with each other, the operation proceeds to T9. In the T9, it is determined whether or not the automatic notification signal has been received from the automatic notification signal generator 10. When the automatic notification signal is determined to have been received, the operation proceeds to T10. In the T10, a notification for notifying the emergency call center 12 of an emergency such as accident is performed. During this notification, in addition to the vehicle body number (VIN) and the emergency notification phone number (CIM number), vehicle location information, the remaining configuration data and others are transmitted to the emergency call center 12, as mentioned above.

In the T9, in the event of sudden illness or the like, it may be determined whether or not VIN information including a vehicle body number (VIN) from a vehicle-side device has been received via the manual notification switch 18. In this case, as with the case where the automatic notification signal has been received, the operation proceeds to the T10, and, in the T10, a notification for notifying the emergency call center 12 of an emergency is performed.

Next, functions/advantageous effects of the on-vehicle emergency notification device according to this embodiment will be described. In the on-vehicle emergency notification device according to this embodiment, when the voltage of the vehicle-mounted main battery 16 is lowered (the causes include damage of the main battery or disconnection of interconnection to the main battery), the power supply is switched to the auxiliary battery 6. However, when the on-vehicle emergency notification device is in the factory mode, the switching to the auxiliary battery 6 is prohibited. For example, in a situation where the vehicle is transported from a vehicle factory to a dealer, the on-vehicle emergency notification device is in the factory mode. Thus, in this situation, it is possible to suppress electric power consumption of the auxiliary battery due to dark current caused by the switching to the auxiliary battery.

The on-vehicle emergency notification device according to this embodiment is configured such that, when the factory mode is shifted to the market mode, the switching to the auxiliary battery 6 is permitted. Thus, even in a situation where the voltage of the main buttery 16 is lowered due to traffic accident or the like, it is possible to perform a notification to the emergency call center 12.

The on-vehicle emergency notification device according to this embodiment is configured such that, when it receives a receipt signal indicative of receipt of the vehicle body number and emergency notification phone number, from the emergency call center 12, the switching to the auxiliary battery is permitted. Thus, even in the situation where the voltage of the main buttery is lowered due to traffic accident or the like, it is possible to perform a notification to the emergency call center 12.

LIST OF REFERENCE SIGNS

1: on-vehicle emergency notification device
2: emergency notification unit (DCM)
4: built-in phone
6: auxiliary battery
8: memory
10: automatic notification signal generator
12: emergency call center
14: phone antenna
16: main battery
18: manual notification switch
20: positioning antenna
22: microphone
24: speaker
26: state display indicator
28: audio
30: external tool connection terminal
32: rescue facilities

The invention claimed is:

1. An on-vehicle emergency notification device for performing a notification to an external information center, in the event of an emergency regarding a vehicle or a vehicle occupant, comprising an auxiliary battery,
wherein the on-vehicle emergency notification device is configured such that,
when a voltage of a main battery mounted on the vehicle is lowered, a power supply thereof is switched from the main battery to the auxiliary battery, and
wherein the on-vehicle emergency notification device is configured to allow a vehicle body number and an emergency notification phone number to be registered therein in the form of a set, so as to enable the notification to the information center,
wherein the on-vehicle emergency notification device is configured such that:
the on-vehicle emergency notification device is set in a factory mode until a receipt signal indicative of receipt of the vehicle body number and the emergency notification phone number is received from the external information center,
during execution of the factory mode for performing the registration of the vehicle body number and the emergency notification phone number, rewriting of the vehicle body number is permitted;
after the registration of the vehicle body number and the emergency notification phone number is completed and then the factory mode is shifted to a market mode, the rewriting of the vehicle body number is prohibited; and, when it is in the factory mode, the switching to the auxiliary battery is prohibited.

2. The on-vehicle emergency notification device according to claim 1, which is configured such that, when the factory mode is shifted to the market mode, the switching to the auxiliary battery is permitted.

3. The on-vehicle emergency notification device according to claim 1, which is configured such that, when it receives a receipt signal indicative of receipt of the vehicle body number and emergency notification phone number, from the information center, the switching to the auxiliary battery is permitted.

4. The on-vehicle emergency notification device according to claim 3, wherein the receipt signal to be received by the on-vehicle emergency notification device is a signal to be transmitted from the information center to the on-vehicle emergency notification device, when the vehicle body number and the emergency notification phone number currently received by the information center are coincident, respectively, with a vehicle body number and an emergency notification phone number preliminarily acquired by the information center.

5. The on-vehicle emergency notification device according to claim 1, which is configured such that, when it is in the factory mode in a situation where the vehicle is transported from a vehicle factory for manufacturing vehicles to a dealer, connection with the main battery is cut.

6. An on-vehicle emergency notification device for performing a notification to an external information center, in the event of an emergency regarding a vehicle or a vehicle occupant, comprising an auxiliary battery,
wherein the on-vehicle emergency notification device is configured such that,
when a voltage of a main battery mounted on the vehicle is lowered, a power supply thereof is switched from the main battery to the auxiliary battery, and
wherein the on-vehicle emergency notification device is configured to allow a vehicle body number and an emergency notification phone number to be registered therein in the form of a set, so as to enable the notification to the information center,
wherein the on-vehicle emergency notification device is configured such that:
the on-vehicle emergency notification device is set in a factory mode until a receipt signal indicative of receipt of the vehicle body number and the emergency notification phone number is received from the external information center,
during execution of the factory mode for performing the registration of the vehicle body number and the emergency notification phone number, rewriting of the vehicle body number is permitted,
after the registration of the vehicle body number and the emergency notification phone number is completed and then the factory mode is shifted to a market mode, the rewriting of the vehicle body number is prohibited; and, when it is in the factory mode, the switching to the auxiliary battery is prohibited, and
a controller receives a received vehicle body number from the on-vehicle emergency notification device when a power supply of the vehicle is turned on, and compares the received vehicle number and the vehicle body number in the external information center,
the on-vehicle emergency notification device operates to indicate malfunction on the state display indicator when the received vehicle number and the vehicle body number in the external information center are not coincident with each other.

* * * * *